United States Patent [19]

Esaki et al.

[11] 4,312,651
[45] Jan. 26, 1982

[54] AIR CLEANER HOUSING

[75] Inventors: Hisao Esaki, Nagoya; Yoshiro Uchida, Toyota, both of Japan

[73] Assignee: Nippondenso Co., Ltd., Kariya, Japan

[21] Appl. No.: 139,242

[22] Filed: Apr. 11, 1980

[30] Foreign Application Priority Data

May 30, 1979 [JP] Japan .................. 54-72596[U]

[51] Int. Cl.³ ............................................. B01D 46/02
[52] U.S. Cl. ...................................... 55/502; 55/503; 55/509
[58] Field of Search ............... 55/492, 498, 502, 503, 55/507, 509, 510; 210/450, 477, 478

[56] References Cited

U.S. PATENT DOCUMENTS

| 2,189,704 | 2/1940 | Campbell | 55/502 |
| 2,314,573 | 3/1943 | Clark et al. | 55/492 |
| 2,836,258 | 5/1958 | Price | 55/507 |
| 3,201,927 | 8/1965 | Wächter | 55/510 |
| 3,507,098 | 4/1970 | Veres et al. | 55/502 |
| 3,898,066 | 8/1975 | Miskiewicz | 55/509 |

FOREIGN PATENT DOCUMENTS

| 401192 | 1/1943 | Italy | 55/498 |
| 1433232 | 4/1976 | United Kingdom | 55/509 |

Primary Examiner—David L. Lacey
Attorney, Agent, or Firm—Cushman, Darby & Cushman

[57] ABSTRACT

In an air cleaner including a case open at the top and closed at the bottom, a cap covering the open top of the case, the case and/or the cap being formed of synthetic resin, and an annular air filter element fitted in the case, a holding plate is mounted on the bottom of the case for movement axially of the case, and a spring for urging the holding plate toward the cap is mounted between the bottom of the case and the holding plate, so that the filter element can be sealingly held between the holding plate and the cap of the case through gaskets. The holding plate has secured thereto a plate spring resiliently engaging the inner circumferential surface of the filter element for securing the latter in place. A stepped support plate is secured to the bottom of the case for restricting the vertical movement of the holding plate.

5 Claims, 6 Drawing Figures

4,312,651

AIR CLEANER HOUSING

BACKGROUND OF THE INVENTION

This invention relates to improvements in an air cleaner for filtering and cleaning air drawn by suction into an internal combustion engine.

Generally, an air cleaner of the type described includes a casing formed mostly of sheet iron, and the heat generated in the internal combustion engine is such that the casing can maintain its resilience and is not deformed to a degree that gaps are formed in the seals. However, there has in recent years been a tendency to use a synthetic resinous material for forming a casing to reduce the weight. When this is the case, particularly when a thermoplastic synthetic resinous material is used as material for forming a casing of an air cleaner, the casing tends to undergo creep deformation due to the heat generated in the internal combustion engine, with a result that a sealing load applied to the gaskets to hold in place the annular air cleaning filter element is relieved. A reduction in the sealing load would induce wobbling of the filter element within the casing when vibration of the internal combustion engine and a vehicle mounting such engine is transmitted thereto. This would separate the filter element from the gaskets to form gaps through which unfiltered air would be drawn into the internal combustion engine, thereby having harmful effects, such as obturation of the carburetor and wear caused on the cylinders of the combustion chamber, etc.

To obviate the aforesaid disadvantages of the air cleaner casing formed of a synthetic resinous material, proposals have been made to increase the thickness of the casing, or to add ribs thereto. Although these proposals have effect to a certain extent, it has hitherto been impossible to completely avoid a reduction in the sealing load applied to the gasket which is caused by creep deformation of the casing caused by heat. Moreover, the measures taken in accordance with these proposals spoils the advantage offered by the use of a synthetic resinous material because the amount of the synthetic resinous material required increases and the weight of the casing also increases.

SUMMARY OF THE INVENTION

This invention has as its object the provision of an air cleaner for an internal combustion engine which is of a construction capable of completely avoiding a reduction in the sealing load applied to the gaskets caused by creep deformation of the air cleaner, even if one or both of the case and cap are formed of a synthetic resinous material.

The outstanding characteristics of the present invention are that holding means is located in the case for containing an annular filter element and movable axially of the case so that the annular filter element is sealed in and held between the holding means and a cap of the case, and that spring means is provided for urging by its biasing force the holding means toward the cap of the case. In this constructional form, a reduction in the sealing load would be minimized because the holding means is urged by the biasing force of the spring means to force the filter element against the cap, even if the case and cap undergo thermal deformation and the filter element tends to be released from contact with one or both of the gaskets on the case side and cap side, thereby enabling the filter element to be placed under a predetermined sealed condition at all times. Also, the dimensional errors occurring in the filter element could be accommodated by the spring means, to allow the filter element to be sealed as desired.

In a preferred embodiment of the invention, the holding means may be in the form of a holding plate located inside the case on its bottom, and a coil spring or a plate spring may be mounted between the holding plate and the bottom of the case to urge by its biasing force the holding plate in a direction in which the holding plate is moved away from the bottom surface of the case. The annular filter element is sealed in and held between the holding plate and the cap. The holding plate is provided with means for resiliently engaging the inner circumferential surface of the annular filter element to secure the filter element in place.

DESCRIPTION OF THE PREFERRED EMBODIMENT

Figure 1:
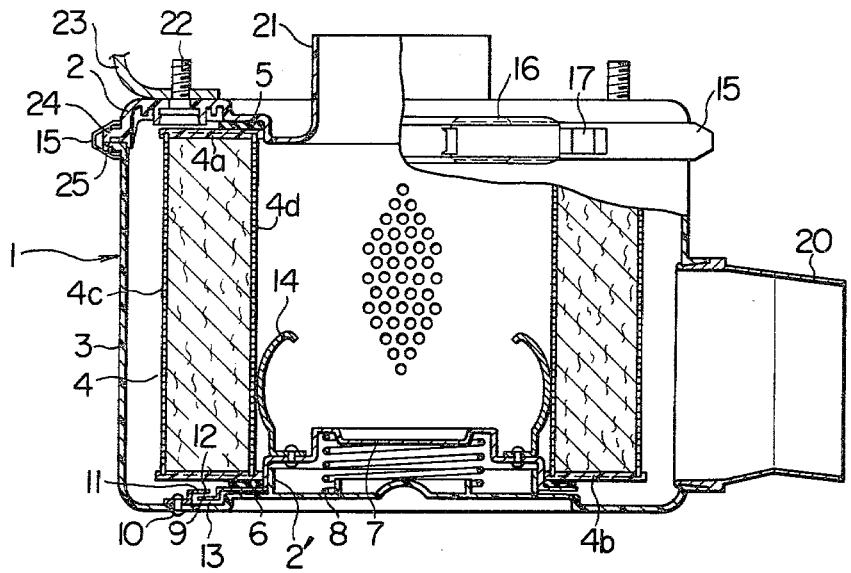
FIG. 1 is a side view, with certain parts being shown in section, of the air cleaner according to the present invention.
Figure 2:
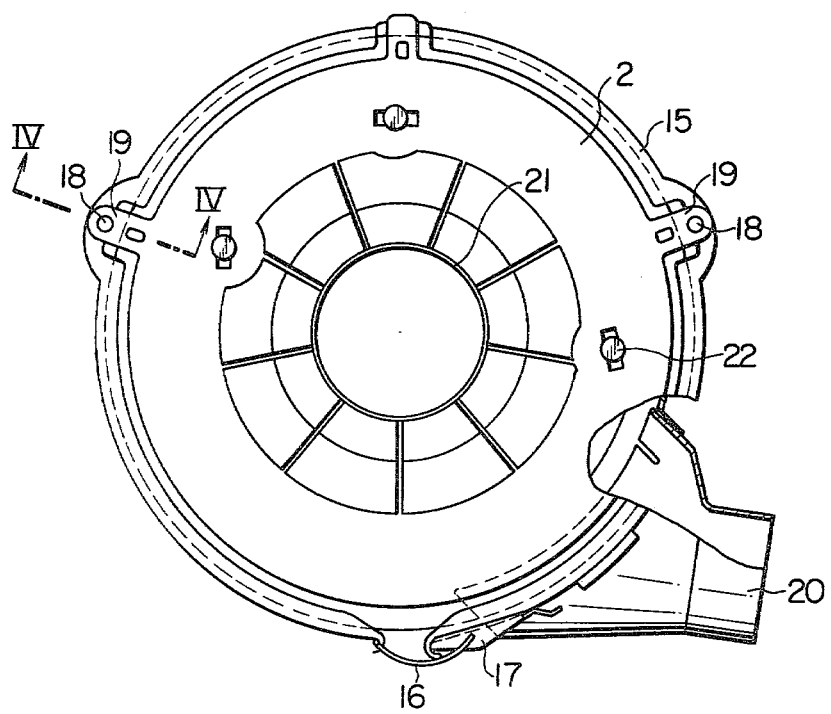
FIG. 2 is a plan view of the air cleaner shown in FIG. 1.
Figure 3:
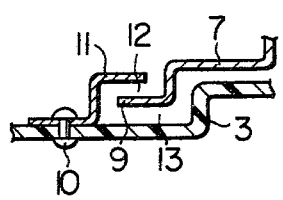
FIG. 3 is a fragmentary sectional view, on an enlarged scale, of the holding plate in relation to the support plate.
Figure 4:
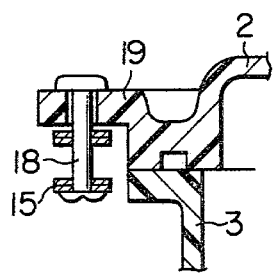
FIG. 4 is a sectional view taken along the line IV—IV in FIG. 2.

The present invention will now be described in detail by referring to the accompanying drawings.

FIGS. 1-4 show one embodiment, wherein an air cleaner 1 comprises a cap 2, a case 3 and an annular air cleaning filter element 4. The filter element 4 has secured to opposite ends thereof end plates 4a and 4b for supporting cylindrical bodies 4c and 4d formed of perforated metal and located at the outer and inner circumferences of the annular filter element 4. At least one of the cap 2 and case 3 is formed of a synthetic resinous material, such as polypropylene. Sealing between the filter element 4 on the one hand and the cap 2 and case 3 on the other is effected by sealing members, such as gaskets 5 and 6, respectively. The gasket 6 between the filter element 4 and case 3 is bonded to a holding plate 7 for the filter element 4 which is held in place on the bottom of the case 3 by spring means, such as a coil spring 8. The holding plate 7, which is guided axially of the case 3 by a guide 2' mounted in the case 3, is formed with more than two support portions 9 on the entire outer circumferential surface or a portion thereof. The support portions 9 engages a support plate 11 riveted to the bottom of the case 3 at 10, so that when the filter element 4 is removed from the case, dislodging of the holding plate 7 from the case 3 by the biasing force of the coil spring 8 can be prevented. When the holding plate 7 is moved downwardly against the biasing force of the coil spring 8, the support portions 9 can move between the support plate 11 and the bottom of the case 3, i.e. the plate 11 has lost motion engagement with the support portions 9. Thus when the filter element 4 is placed on the holding plate 7 and the case 3 is assembled to the cap 2, clearances 12 and 13 are formed between the support portions 9 of the holding plate 7 and the support plate 11 and the bottom of the case 3 respectively.

The holding plate 7 has mounted thereon a plate spring 14 resiliently engaging the inner circumferential surface of the filter element 4, so that the filter element 4 can be secured on the holding plate 7.

The cap 2 and case 3 are secured together at the entire outer circumference thereof by a band 15 consisting of two or four segments rotatably connected to one another and provided with a spring 16 and a lever 17. The band 15 is secured to holding portions 19 of the cap 2 by pins 18 (See FIG. 4).

The case 3 has an air inlet 20 fitted in an opening, and the cap 2 is formed with a clean air outlet port 21 and bolts 22 for mounting the air cleaner to a vehicle.

In the embodiment shown and described, the cap 2 is mounted by the bolts 22 on a mounting portion 23 of the vehicle at all times. Replacements of the filter element 4 are effected by removing the case 3 from the cap 2. A new filter element 4 is secured in the case 3 by the plate spring 14 of the holding plate 7. The case 3 is then forced against the cap 2, and flanges 24 and 25 of the cap 2 and case 3 respectively are enclosed by the band 15 which is fixed in place by means of the spring 16 and lever 17.

In the air cleaner 1 of the aforesaid constructional form, the filter element 4 is resiliently forced by the coil spring 8 against the cap 2 through the holding plate 7. By this arrangement, the cap 2, holding plate 7 and the filter element 4 are sealed by the gaskets 5 and 6 by virtue of the biasing force of the spring 8, even if there are variations in the vertical dimensions of the cap 2, case 3 and filter element 4, so that no gaps are produced by vibration. The arrangement that the cap 2 and case 3 are uniformly assembled together along the entire outer circumference and held together by means of the band 15 is conductive to the prevention of the application of any concentrated load on the filter element 4 at any circumferential location on its ends.

Figure 5:
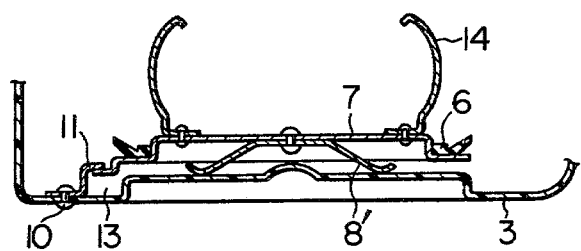
FIG. 5 is a fragmentary sectional view, on an enlarged scale, of a modification of the air cleaner shown in FIG. 1.
Figure 6:
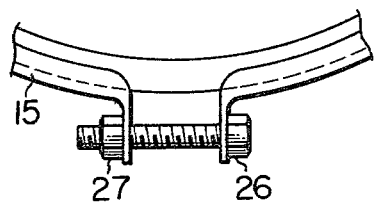
FIG. 6 is a fragmentary plan view, on an enlarged scale, of another modification of the air cleaner shown in FIG. 1.

While the invention has been shown and described hereinabove by referring to a preferred embodiment thereof, it is to be understood that the invention is not limited to the specific form of the invention shown and that many changes and modifications may be made without departing from the scope of the invention. For example, a plate spring 8', not a coil spring, may be used, as shown in FIG. 5, for resiliently urging the holding plate 7 toward the cap 2. Also, a bolt 26 and a nut 27 may be used as shown in FIG. 6, in place of the spring-and-lever arrangement described hereinabove for fastening the band 15. The gaskets 5 and 6 may be mounted on the end plates 4a and 4b of the filter element 4, and the support plate 11 may be formed integrally with the case 3. It is to be understood that the annular filter element 4 may be either circular or polygonal in cross-sectional shape.

From the foregoing description, it will be appreciated that in the air cleaner according to the invention, the end plates of the filter element are kept sealed with respect to the cap and the holding plate in the case at all times by the biasing force of a spring. Thus even if the case or cap undergoes deformation axially of the filter element, no gaps are produced between the filter element on the one hand and the cap and case on the other, thereby avoiding drawing of unfiltered air by the engine.

What is claimed is:

1. An air cleaner housing comprising:
   a generally cylindrical case having an inlet opening an imperforate bottom and an open top for enclosing an annular air cleaning filter element provided with end plates;
   a detachable cap covering said top, at least one of said case and said cap being formed of a synthetic resinous material;
   a holding plate mounted in said case adjacent said bottom for movement axially of said case;
   a stepped support plate secured to the bottom of said case and having lost motion engagement with said holding plate for restricting the axial movement of said holding plate;
   sealing means, including a sealing member secured to said cap in a manner to be brought into intimate contact with one end plate of the filter element and another sealing member secured to said holding plate in a manner to be brought into intimate contact with the other end plate of the filter element, to provide a seal between said filter element and said cap on one hand and said holding plate on the other; and
   spring means urging said holding plate toward said cap.

2. An air cleaner housing as claimed in claim 1, wherein said spring means comprises a coil spring.

3. An air cleaner housing as claimed in claim 1, wherein said spring means comprises a plate spring.

4. An air cleaner housing as claimed in claim 1, wherein said spring means comprises a plate spring secured to said holding plate for resilient engagement with the case bottom for securing the filter element in place.

5. An air cleaner housing as claimed in claim 1, wherein the case and cap are provided with closely adjacent circumferential flanges and including band means for detachably securing said flanges together.

* * * * *